United States Patent [19]
Burtelson

[11] 3,895,879
[45] July 22, 1975

[54] COMBINED POST TENSIONING ANCHOR AND CABLE

[75] Inventor: Frederick W. Burtelson, Lombard, Ill.

[73] Assignee: Reliable Electric Company, Franklin Park, Ill.

[22] Filed: June 6, 1973

[21] Appl. No.: 367,380

Related U.S. Application Data

[62] Division of Ser. No. 38,247, May 18, 1970, Pat. No. 3,762,027.

[52] U.S. Cl. .............................. 403/369; 24/115 R
[51] Int. Cl.² ........................................... F16B 7/04
[58] Field of Search ........... 403/197, 199, 201, 369, 403/374; 52/223, 227, 230; 24/122.6, 115 R; 29/452; 254/29 A

[56] References Cited
UNITED STATES PATENTS

| | | | |
|---|---|---|---|
| 2,233,794 | 3/1941 | Noble | 403/369 |
| 3,399,434 | 9/1968 | Kelly | 403/369 X |
| 3,524,228 | 8/1970 | Kelly | 403/369 |

*Primary Examiner*—Richard J. Scanlan, Jr.
*Assistant Examiner*—Wayne L. Shedd
*Attorney, Agent, or Firm*—Olson, Trexler, Wolters, Bushnell & Fosse, Ltd.

[57] ABSTRACT

A pre-cut length of cable and a dead anchor are preassembled in permanent wedging engagement to provide a cable and dead anchor assembly for shipment to the job site. The apparatus for assembling the cable and anchor is a frame having a slot in one end wall to receive the assembly and a hydraulic cylinder having a tubular ram which pushes the jaw cluster of the anchor into the anchor shell to develop the permanent wedging engagement of the jaw cluster, cable and shell. The push force applied is less than that at which tooth deformation would occur which would cause material reduction of the holding power of the anchor during a later cable tensioning operation. After inspection of the jaw set, a cap is placed over the large end of the shell to prevent entry of the concrete mix.

2 Claims, 9 Drawing Figures

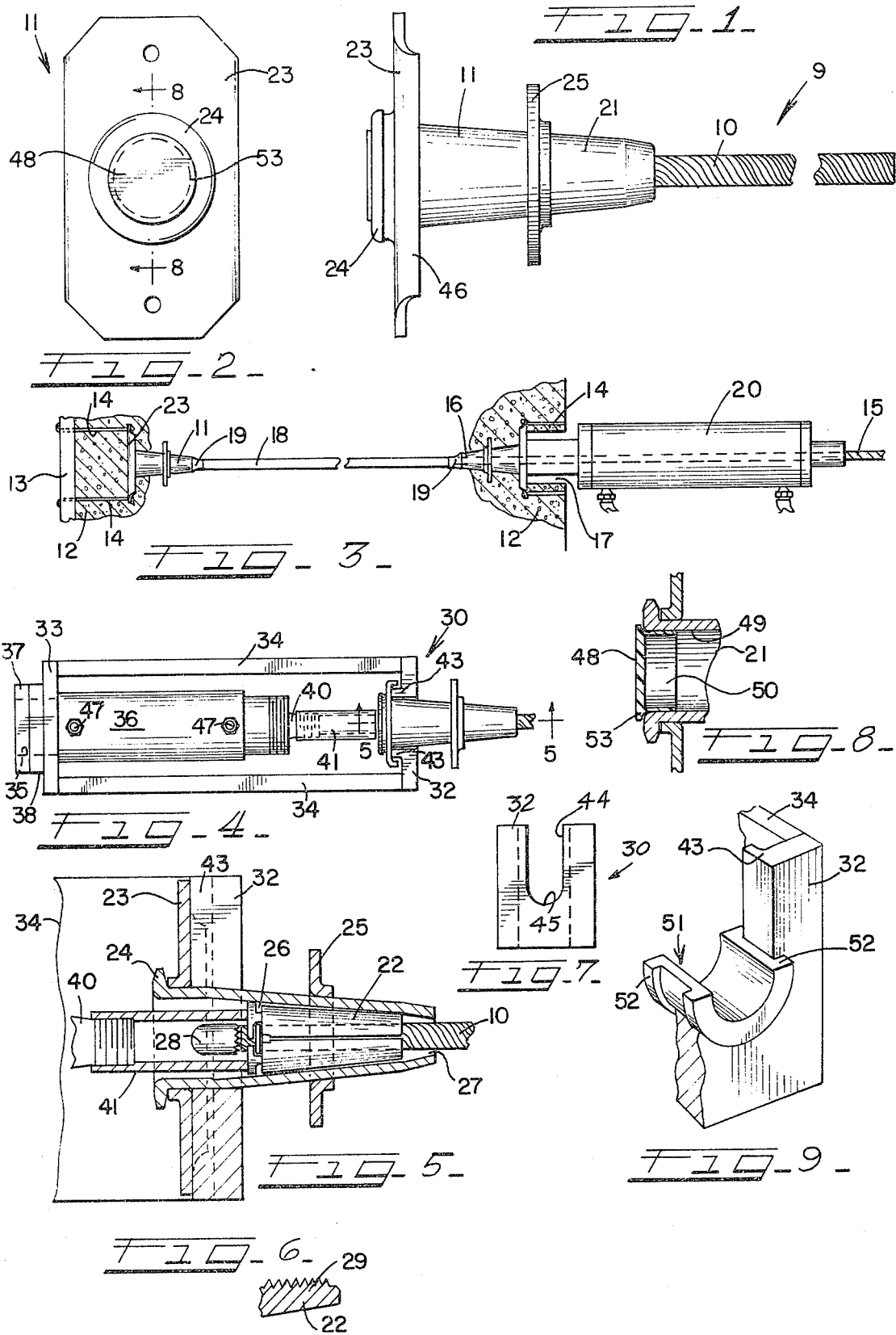

COMBINED POST TENSIONING ANCHOR AND CABLE

This application is a division of my copending application Ser. No. 38,247, filed May 18, 1970, now U.S. Pat. No. 3,762,027.

This invention relates to a cable and dead anchor used in post-tensioned concrete.

One type of post-tensioning method and apparatus is shown in Kelly U.S. Pat. No. 3,399,434 granted Sept. 3, 1968. The tensioning element is a steel cable, sometimes referred to in the trade as a tendon, which has an anchor at each end embedded in the concrete. According to this patent, the anchor is a cable gripping chuck having one or more reaction plates which distribute the stress developed by the cable over several square inches of the concrete.

The cable gripping chuck is very similar to the chucks used in connection with power lines, guy wires and the like. The characteristic of such chucks is that the cable is free to move through the chuck in one direction only; reversal of cable movement actuates the gripping mechanism. Such prior art cable gripping chucks embody a spring which forces the jaws into gripping engagement with the cable to effect a preliminary engagement which is sufficient to prevent the pulling out of the cable under forces encountered during handling and preliminary installation. The final gripping engagement is development by the tension applied to the cable in connection with the final installation of power lines, or in connection with the post-tensioning in concrete work.

However, the techniques suitable for power line work, where the cables are aluminum or copper, are not suitable in the post-tensioned concrete art where the cables are of much harder material. More specifically, the problems involved call for a certain inspection to be made at a certain time.

In some types of anchors or chucks, the end of the shell is closed so that one cannot readily inspect the relationship of the jaws to the cable. In order to provide a proper grip on the cable there must be a uniform set for each of the jaws of the jaw cluster. If one jaw is ahead or behind the others, it will exert a greater or lesser gripping force on that portion of the cable circumference. In the event that it is ahead, the greater force exerted will tend to nick certain of the strands of the cable with the result that if great tension is later applied to the cable that strand or those strands will be broken. In post-tensioned concrete work, the tension applied to the cables is of the order of 30,000 pounds and approaches the breaking strength. It is obvious that this tension must be distributed between the various strands uniformly; unbalanced distribution is likely to cause breakage of the more heavily tensioned strands. This is almost certain to happen if one of the heavily tensioned strands is nicked.

Also, if there are loose or out-of-lay strands extending between the jaws of the jaw cluster, they may interfere with jaw movement with the result that the jaw cluster will not withstand the final tensioning force.

For these reasons therefore, it is important to inspect the relationship of the cable and the jaws after a preliminary gripping engagement has been made.

However, even this does not entirely obviate the possible later failure for the reason that in vibrating the concrete incident to curing if the vibrator element is placed close to the dead anchor, the vibrations will be transmitted to the anchor and may cause a loosening of the preliminary gripping engagement, with the result that at final tensioning after the concrete has set, the cable will be pulled free of the dead anchor.

According to my invention I urge the jaws into engagement with the cable and a shell with a very substantial force to provide what I term as a permanent wedging engagement, and I do this in a manner such that the set of the jaws can be inspected prior to final installation. The term "permanent" does not mean that the parts could not be unwedged by suitable mechanical means, but it does means that the wedging engagement is so tight that the friction between the jaw cluster and the shell prevents movement of the cable into the shell under the forces encountered in vibration and in ordinary handling. More specifically, it is believed that when the parts are in permanent wedging engagement, they are stressed sufficiently as to cause the teeth to start biting into the cable, thus providing interference between the teeth and the cable, which prevents movement in either direction.

More specifically, this initial gripping engagement is effected prior to installation at the job site. Advantages of the present invention are that the cables can be cut to length, assembled and inspected with the dead anchor at a location remote from the job site, such as the shop of the contractor or equipment supplier, and then delivered to the job site.

A further advantage of my invention is that the initial gripping engagement is sufficiently strong that vibration of the cable-anchor assembly incident to trucking it to the job site, and incident to vibrating the concrete, and impact shocks incident to loading and unloading the truck will not cause relaxation of the jaw grip.

According to my invention, I develop the strong initial gripping engagement by pushing the jaws into the shell, referred to herein as a "push grip" as contrasted with the usual "tension grip" effected by tensioning the cable. However, I have found that a push grip of a magnitude equivalent to the final tension grip will deform the jaw teeth and hence reduce the holding power of the chuck or anchor, especially when the teeth of jaws made from SAE 1010 steel, case hardened to 56 RC and zinc plated bite into high carbon steel cable, such as type 270K cable. In a series of tests, this reduction of holding power on a one-half inch seven solid strand 270 K cable was noticeable at an 8,000 pound push grip, but did not occur at a 6,200 pound push grip, the final tensioning being 33,000 pounds. Therefore, according to my invention, the push developed initial gripping engagement should be considerably less than the tension developed final gripping engagement, and with the materials specified, the push grip should not exceed the 6,200 to 8,000 pound range for a jaw cluster 2½ inches long, which could also be expressed as from 18 to 24% of the final tension where the latter is 80% of the minimum ultimate cable strength.

However, the range varies with materials, jaw length, tooth design, number of teeth and possibly other factors, with the result that the maximum limitation on the push grip could be expressed as that at which tooth deformation causes material reduction of holding power.

Of course push grips of lesser magnitude are suitable as long as the various parts are in permanent wedging engagement.

Other objects, features and advantages of my invention will become apparent as the description proceeds.

In the drawings:

FIG. 1 is an elevation of a cable-anchor assembly embodying my invention;

FIG. 2 is an end view of FIG. 1;

FIG. 3 is a fragmentary elevation of a post-tensioning installation embodying my invention;

FIG. 4 is a plan view of the apparatus for assembling the assembly of FIG. 1;

FIG. 5 is a vertical section taken along line 5—5 of FIG. 4, but showing the parts in a changed position;

FIG. 6 is a fragmentary section of one of the jaws;

FIG. 7 is an end view of the apparatus of FIG. 4, with the cable-anchor assembly removed;

FIG. 8 is a fragmentary section taken along line 8, of FIG. 2; and

FIG. 9 is a fragmentary perspective view of the FIG. 4 apparatus, showing a modification.

FIG. 1 shows a cable-anchor assembly 9 which comprises a tendon or steel cable 10 of a predetermined length which is preassembled with an end anchor 11 in such a manner that the parts are in permanent wedging engagement.

FIG. 3 illustrates the use of the cable-anchor assembly in a post-tensioning installation for the slab 12. The slab 12 is cast between forms which are removed after the concrete has set, one of the forms 13 being shown. The cable-anchor assembly is secured at its anchor end to the form 13 by nails 14 or small diameter tie bolts before the concrete is poured. The complete method is set forth in the aforesaid Kelly U.S. Pat. No. 3,399,434, and it involves the running of the free end portion 15 of the cable 10 through a second anchor 16, referred to as the live anchor, which is similarly secured to the form (not shown) at the opposite side of the slab, the free end portion 15 extending through the live anchor 16 and through the form, and through a rubber bushing, not shown, confined between the two so as to provide a cavity 17 in the edge of the slab 12.

A plastic jacket 18 surrounds the cable 10 at points between the anchors 11 and 16, and the jacket ends are taped to the anchors as at 19 in order to prevent the entry of the liquid concrete mix into the interior of the anchor 11 and jacket 18.

After setting, and removal of the forms, a hydraulic jack 20 is applied to the free end portion 15 of the cable, with the nose of the jacket extending into the cavity 17 and bearing against the anchor 11. Then the jack 20 is operated to tension the cable to the degree specified, such as 33,000 pounds.

The tension elongates the cable 11, and it is free to move through the anchor 16 in one direction, but as soon as the hydraulic jack 20 is reversed to release the tension, the cable is automatically gripped, so that the cable retains its tension. Due to this automatic gripping action, the anchor 16 is referred to as the live anchor, whereas the end anchor 11 is referred to as the dead anchor.

The dead anchor 11 comprises a tapered shell 21, a jaw cluster 22 disposed within the shell 21, and a reaction plate 23 surrounding the head of the shell and interlocking with a head flange 24. A second reaction plate 25 is secured to the shell 21 by wedging to react with the concrete.

The jaw cluster 22 (FIG. 5) comprises a plurality of tapered jaw segments loosely secured to each other and maintained in transverse alignment with each other by a cluster ring 26. The jaws surround a cable 10 inserted through the opening 27 in the small end of the shell. When the end of a cable is inserted through the opening 27, the jaw cluster 22 tends to be displaced rearwardly. However, if the rearward movement is restrained, as by the prior art spring, the end of the cable tends to work its way between the jaws and beyond them. This action is facilitated by a pilot cup 28. Then a tug on the cable will pull the jaws forward into a preliminary gripping engagement between the tapered shell wall 21 and the cable 10. Teeth 29 on the jaw segments (FIG. 6) improve the gripping engagement when finally developed.

According to my invention, I provide a fixture 30 for developing the initial gripping engagement (FIGS. 4 and 5).

The fixture 30 is a frame-like structure comprising a front wall 32, a rear wall 33, and side walls 34. These are secured to each other by screws and then welded. The rear wall 33 has a circular opening which receives the threaded mounting shank 35 of a hydraulic cylinder 36. The cylinder is firmly secured in place by a nut 37 and a spacer 38.

The piston 40 of the cylinder 36 carries a tubular ram 41, having an annular jaw engaging face.

The front wall 32 is milled down to provide rearwardly extending flanges 43 disposed on either side of a slot 44. The slot 44 is adapted to receive the shell 21 of dead anchor 11, and to this end has a rounded bottom 45, corresponding to the diameter of the large end of the shell. The flanges 43 engage the reaction plate 23. The milled down portion accommodates the vertical reinforcing flanges 46 of the reaction plate 23.

Suitable hose connections 47 are pprovided on the cylinder 36 for connecting same into a fluid circuit.

In operation, the cable end or pilot 28 is inserted through the opening 27 and between the jaws of the jaw cluster 22, preferably while the anchor 11 is held vertically with one hand, and the end 28 is caused to pass through the jaws up to about the point shown in FIG. 6, so that it terminates short of the rear end of the shell 21. Then, the anchor 11 is inserted into the fixture as shown in FIG. 5, and the hydraulic cylinder operated to bring the face of the ram 41 into engagement with the rear surface of the jaw cluster. As the ram 41 moves forwardly, the cable end 28 is received within the hollow interior thereof. Continued movement of the ram 41 forces the jaw cluster 22 as far forward as it will go under the pressure applied.

In a practical embodiment of my invention, in which the piston area is 1.7 square inches, a hydraulic pressure of 3,500 pounds is used to develop a force of substantially 6,200 pounds. With a shell jaw taper of 10°, this force will develop a compressive stress of substantially 13,000 pounds in the jaws and cable. This has been found sufficient to provide the desired permanent wedging engagement.

After removal and inspection of the cable-anchor assembly 9, the large end is closed by a plastic cap 48 which fits tightly within the opening at the large end of the shell 21 to provide a waterproof closure. Thus when the cable-anchor assembly 9 is set up in a form and the concrete poured, the cap 48 prevents the mix from entering into the rear end of the shell, and the tape 19 performs the same function at the front opening 27.

The inner surface 49 (FIG. 8) at the large end of the shell 21 is smooth and substantially cylindrical so as to form a good seal with the skirt 50 of the cap 48. The cap also has a flange 53 to permit removal for further inspection, if desired.

The fixture 30 and the slot 44 illustrated are designed to accommodate anchor shells for half-inch cable. For smaller diameter shells, such as those used with ⅜-inch cable, an adapter 51 may be provided as shown in FIG. 9. The adapter 51 overlies the rounded bottom 45 of the slot, and is provided with flanges 52 which interlock with the front and rear surfaces of the front plate 32, to maintain the adapter in position. A smaller size ram 41 may also be substituted for use with a smaller diameter shell.

In the example described and shown, the 6,200 pound pushing force applied to the rear end of the jaw cluster produced a movement of from one-eighth to three-sixteenths of an inch. The 33,000 pound tension applied to the cable produced a further movement of the jaw cluster of substantially three-eighths of an inch.

In some instances, the cable is supplied to the contractor or equipment supplier already jacketed and greased and wound on reels. In such instances, the assembly 9 of FIG. 1 would also include the jacket 18, as shown in FIG. 3, as well as the tape 19, and the jacket would be pre-cut to the length shown in FIG. 3, with the end portion 15 extending beyond it.

The method and apparatus of the present invention are equally applicable to slabs, beams, and other concrete structural elements.

Although only a preferred embodiment of the present invention has been described herein, it will be understood that various modifications and changes may be made in the construction shown without departing from the scope of the invention as pointed out in the appended claims.

The invention is claimed as follows:

1. A cable and dead anchor assembly for use in post-tensioned concrete comprising an anchor sub-assembly and a pre-cut length of cable, said anchor sub-assembly comprising a tapered shell open at both ends and having a flange at its larger end, a reaction plate having an aperture therein, said tapered shell being received in said aperture with said flange engaging said reaction plate, a tapered jaw cluster disposed within said shell and comprising circumferentially disposed jaws, a removable closure cap disposed within the shell at its larger end, and a cable extending through the smaller end of said shell and being disposed centrally of said jaw cluster, and terminating short of said closure cap, the jaws of said jaw cluster being equally spaced from the larger end of the shell in permanent wedging engagement with said cable and with the inner surface of said shell, said permanent wedging engagement being of a type that is formed by a push-developed axial pressure imposed from an external power source against the larger end of the jaw cluster and in a direction toward the smaller end of the shell and substantially uniformly on said jaws so that each jaw engages said cable with substantially the same gripping force and subsequent movement of the cable in the jaws is prevented during handling and vibration incident to curing of the concrete, said anchor sub-assembly and said precut length of cable being a separate transportable structure.

2. A cable and dead anchor assembly as claimed in claim 1 in which said cable has a plastic jacket thereon extending substantially from the smaller end of the shell over a length of the cable less than said pre-cut length.

* * * * *